United States Patent [19]

Sekhar et al.

[11] Patent Number: 5,753,382
[45] Date of Patent: May 19, 1998

[54] CARBON BODIES RESISTANT TO DETERIORATION BY OXIDIZING GASES

[75] Inventors: Jainagesh A. Sekhar; James Jenq Liu, both of Cincinnati, Ohio; Vittorio de Nora, Nassau, Bahamas

[73] Assignee: Moltech Invent S.A., Luxembourg

[21] Appl. No.: 584,047

[22] Filed: Jan. 10, 1996

[51] Int. Cl.⁶ .............................. H01M 4/88; H01M 4/96
[52] U.S. Cl. .................. 429/42; 204/290 R; 502/101; 427/113; 427/126.1
[58] Field of Search ................ 427/113, 126.1, 427/419.7, 427; 429/42; 204/290 R; 502/101; 252/389.4, 400.4

[56] References Cited

U.S. PATENT DOCUMENTS

| | | |
|---|---|---|
| 3,028,324 | 4/1962 | Ransley . |
| 3,330,756 | 7/1967 | Ransley . |
| 3,348,929 | 10/1967 | Valtschev et al. . |
| 3,442,787 | 5/1969 | Landrum et al. . |
| 3,705,791 | 12/1972 | Bredzs . |
| 3,852,107 | 12/1974 | Lorkin et al. . |
| 3,856,650 | 12/1974 | Kugler et al. . |
| 3,881,039 | 4/1975 | Baldierei et al. ............... 429/294 |
| 3,939,028 | 2/1976 | Schiffarth et al. . |
| 3,969,124 | 7/1976 | Stewart . |
| 4,145,242 | 3/1979 | Chow ............................ 427/427 X |
| 4,268,582 | 5/1981 | Hale et al. .................. 427/419.7 X |
| 4,279,709 | 7/1981 | McIntyre et al. ............ 204/290 R X |
| 4,308,114 | 12/1981 | Das et al. ..................... 204/67 |
| 4,308,115 | 12/1981 | Foster, Jr. et al. . |
| 4,333,813 | 6/1982 | Kaplan et al. . |
| 4,342,637 | 8/1982 | Withers et al. . |
| 4,374,761 | 2/1983 | Ray . |
| 4,439,382 | 3/1984 | Joo' et al. . |
| 4,439,491 | 3/1984 | Wilson . |
| 4,460,440 | 7/1984 | McGeer ......................... 204/67 |
| 4,466,996 | 8/1984 | Boxall et al. ................. 427/122 |
| 4,532,017 | 7/1985 | Keinborg et al. ............. 204/67 |
| 4,533,452 | 8/1985 | Leroy et al. . |
| 4,535,035 | 8/1985 | Smilaket et al. . |
| 4,540,475 | 9/1985 | DeAngelis ..................... 204/67 |
| 4,559,270 | 12/1985 | Sara . |
| 4,560,448 | 12/1985 | Sane et al. ..................... 204/67 |
| 4,567,103 | 1/1986 | Sara .............................. 428/408 |
| 4,582,553 | 4/1986 | Buchta . |
| 4,595,545 | 6/1986 | Sane . |
| 4,600,481 | 7/1986 | Sane et al. . |
| 4,605,440 | 8/1986 | Halverson et al. . |
| 4,610,726 | 9/1986 | King . |
| 4,610,857 | 9/1986 | Ogawa et al. . |
| 4,613,375 | 9/1986 | Förster et al. . |
| 4,650,552 | 3/1987 | de Nora et al. . |
| 4,655,830 | 4/1987 | Akashi et al. . |

(List continued on next page.)

FOREIGN PATENT DOCUMENTS

| | | |
|---|---|---|
| 1107113 | 12/1955 | France . |
| 9428200 | 12/1994 | WIPO . |

OTHER PUBLICATIONS

Chemical Abstracts, vol. 112, No. 8, Feb. 19, 1990, *Thermal Stability of Boron–Containing Impregnating Agents Inhibiting the Oxidation of Electrode Graphite, and Tsvetn. Met* No. 9, (Moscow) 1989, pp. 62–64.

*Primary Examiner*—Stephen Kalafut
*Attorney, Agent, or Firm*—Dinsmore & Shohl LLP

[57] ABSTRACT

A carbon body, in particular a prebaked anode of an electrolytic cell for the production of aluminum by the electrolysis of alumina in a molten fluoride electrolyte, is treated over its surfaces to improve the resistance thereof to deterioration during operation of the cell by air and oxidizing gases released at the anode, by immersing the body in a treating liquid containing a soluble boron compound and at least one aluminum compound and/or at least one calcium compound as a powder, suspension or colloid or in solution, e.g. at 80° to 120° C. The same treatment can also be applied to a carbon mass forming a Söderberg anode and to cell sidewalls. The addition of the aluminum and/or calcium compound(s) increases strength and improves oxidation resistance compared to impregnation with boric acid alone.

51 Claims, 1 Drawing Sheet

U.S. PATENT DOCUMENTS

| | | |
|---|---|---|
| 4,670,201 | 6/1987 | Montgomery et al. . |
| 4,678,760 | 7/1987 | Ray . |
| 4,680,094 | 7/1987 | Duruz ............................... 204/67 |
| 4,710,348 | 12/1987 | Brupbacher et al. . |
| 4,738,389 | 4/1988 | Moshier et al. . |
| 4,751,048 | 6/1988 | Christodoulou et al. . |
| 4,769,074 | 9/1988 | Holcombe, Jr. et al. . |
| 4,770,825 | 9/1988 | Sara . |
| 4,772,452 | 9/1988 | Brupbacher et al. . |
| 4,774,052 | 9/1988 | Nagle et al. . |
| 4,808,372 | 2/1989 | Koczak et al. . |
| 4,824,531 | 4/1989 | Duruz et al. . |
| 4,836,982 | 6/1989 | Brupbacher et al. . |
| 4,909,842 | 3/1990 | Dunmead et al. . |
| 4,915,903 | 4/1990 | Brupbacher et al. . |
| 4,929,328 | 5/1990 | Besmann et al. . |
| 4,948,676 | 8/1990 | Darracq et al. . |
| 4,961,778 | 10/1990 | Pyzik et al. . |
| 4,985,202 | 1/1991 | Moshier et al. . |
| 4,988,645 | 1/1991 | Holt et al. . |
| 5,019,225 | 5/1991 | Darracq et al. . |
| 5,071,533 | 12/1991 | de Nora et al. . |
| 5,077,246 | 12/1991 | Weaver et al. . |
| 5,110,688 | 5/1992 | Sekhar et al. . |
| 5,112,654 | 5/1992 | Claar . |
| 5,149,595 | 9/1992 | Kojo et al. . |
| 5,158,655 | 10/1992 | Townsend . |
| 5,188,678 | 2/1993 | Sekhar et al. . |
| 5,194,330 | 3/1993 | Vandebulcke et al. . |
| 5,213,730 | 5/1993 | Hida . |
| 5,217,583 | 6/1993 | Sekhar et al. ............... 204/67 |
| 5,250,324 | 10/1993 | Claar . |
| 5,316,718 | 5/1994 | Sekhar . |
| 5,320,717 | 6/1994 | Sekhar ....................... 204/67 |
| 5,340,014 | 8/1994 | Sekhar et al. . |
| 5,340,448 | 8/1994 | Sekhar et al. ............... 204/67 |
| 5,342,491 | 8/1994 | Sekhar . |
| 5,362,366 | 11/1994 | de Nora et al. . |
| 5,364,442 | 11/1994 | Sekhar . |
| 5,364,513 | 11/1994 | Sekhar et al. . |
| 5,374,342 | 12/1994 | Sekhar . |
| 5,376,421 | 12/1994 | Sekhar et al. . |
| 5,378,327 | 1/1995 | Sekhar et al. ............... 204/67 |
| 5,397,450 | 3/1995 | Sekhar et al. . |
| 5,409,589 | 4/1995 | Sekhar . |
| 5,413,689 | 5/1995 | de Nora et al. . |
| 5,472,578 | 12/1995 | de Nora . |
| 5,486,278 | 1/1996 | Manganiello et al. . |
| 5,486,287 | 1/1996 | Manganiello et al. .......... 204/290 R X |
| 5,514,495 | 5/1996 | Klaus .................. 204/290 R X |
| 5,527,442 | 6/1996 | Sekhar et al. . |
| 5,534,119 | 7/1996 | Sekhar . |
| 5,534,130 | 7/1996 | Sekhar . |

CARBON BODIES RESISTANT TO DETERIORATION BY OXIDIZING GASES

FIELD OF THE INVENTION

This invention relates in general to the treatment of carbon bodies which are exposed to high temperature oxidizing gases, in order to improve the resistance of the bodies to deterioration by these oxidizing gases.

The invention is concerned in particular with carbon bodies which are used as components of electrolytic cells for the production of aluminum, for example by the electrolysis of alumina in a molten fluoride electrolyte such as cryolite, wherein in use of the cell the carbon components are exposed to air and anodically-generated oxidizing gases.

One aspect of the invention is the method of treating such cell components or other carbon bodies to improve their resistance to deterioration by oxidizing gases at high temperatures. Further aspects of the invention concern the treated cell components and other carbon bodies, aluminum production cells including these components, an improved treatment liquid and use of this liquid to improve the oxidation resistance of carbon bodies.

BACKGROUND ART

Aluminum is produced conventionally by the Hall-Héroult process, by the electrolysis of alumina dissolved in cryolite-based molten electrolytes at temperatures up to around 950° C. In Hall-Héroult cells, the anodes are usually prebaked carbon blocks that are consumed by the electrochemical reaction, corroded by contact with the electrolyte and disintegrated by the air and/or oxidizing gases present. Söderberg anodes made of a coherent carbon mass which solidifies in situ are also used.

Prebaked anodes for aluminum production are made of a matrix of petroleum coke with pitch as binder. Their production involves various phases including preparing and treating the starting materials, mixing, forming and calcining at high temperature, followed by securing the current supply member by rodding.

The resistance of that part of the anode which remains outside the bath during cell operation is of paramount importance, not only to decrease the amount of anode consumption above the theoretical requirement but also to reduce the formation of carbon dust which is a cause also of a reduction in current efficiency and an increase in cell temperature, and which must be eliminated when it collects on the bath surface.

Of the several attempts to protect the anode, none has so far been satisfactory. The normal protection by aluminum spraying is costly and not always impervious. The oxidation of the carbon anodes, in the Hall-Héroult cell, outside the bath leads to a loss for the aluminum producer. Typically, instead of the theoretical consumption of 0.33 kg of carbon per ton of aluminum, often more than 0.43 kg is lost, the difference being caused mainly by air and $CO_2$ burn.

Many elements or compounds catalyze the oxidation reaction of carbons but the inhibition of the same reaction is more difficult to achieve. In general, the oxidation reactivity of carbon is reduced with absorbers, or with ceramic protection layers. Several absorber additives have been reported, such as metal, halogen compounds, and incorporated nitrogen. Ceramic protecting layers have been proposed, formed by low melting liquid glass, such as $B_2O_3$, $Cr_2O_3$, Silica, etc.

The oxidation prevention treatment processes contemplated for the anode can be divided into two different groups, one is an additive added after the anode baking, the other is an additive added into the carbon paste. To date, only an aluminum coating protection treatment, or a thick layer of alumina and cryolite, has worked reasonably well for oxidation protection of commercial pre-baked anodes, but has several drawbacks, such as cost and difficulties in the cell operation. No oxidation protection has so far been suggested for Söderberg continuous anodes. Several other oxidation prevention treatments have worked well in the laboratory but have fallen short of the expected performance when the same treatments have been applied to the anodes tested in commercial cells. No apparent reason has been forthcoming and the discussion of such an effect has invariably been directed towards the possibility of the composition of the anode gases being the reason for such a difference.

When boron has been added to the anode paste in the form of elemental boron or of boron compound, the oxidation rate of the carbon has been reduced but the contamination of aluminum is unacceptable.

Recently, PCT patent application WO94/28200 has disclosed a treatment process which has been shown to significantly reduce the oxidation of the anode in the laboratory as well in commercial cell tests in the pre-baked carbon anodes. This method comprises treating the anode or other component in a boron-containing liquid to intake the boron-containing liquid to a selected depth over parts of the surface to be protected, this selected depth being in the range 1–10 cm, preferably at least 1.5 cm and at most about 5 cm, preferably still at least about 2 cm and at most about 4 cm. This method was found to significantly reduce the oxidation of pre-baked anodes in laboratory tests and in commercial test cells. However, as discussed in detail below, it has been found unexpectedly that the greatly improved oxidation resistance obtained with this treatment is partly offset by a strength loss which could lead to burn-off after a critical weight loss when the anode is subjected to stress. This could lead to problems when the components are scaled up to industrial size.

Problems like those described above for prebaked carbon anodes apply also to the carbon cell sidewalls including a lower part submerged in the electrolyte and an upper part which is exposed to $CO_2$-enriched air, and which disintegrate and wear away as a result of attack by oxidizing gases.

SUMMARY OF THE INVENTION

An object of the invention is to improve the resistance to oxidation of carbon bodies in particular carbon anodes or cell sidewalls of aluminum production cells by the incorporation of boron without the inherent drawbacks of the known proposals.

The invention is based on the insight that boron impregnated anodes and other carbon cell components made usually from petroleum coke and pitch suffer the drawback that the oxidation occurs particularly at the pitch location (bonding phase). With increasing time, the excess weight loss and disintegration of pitch (which is the bonding phase) reduces the overall mechanical strength so that after a certain time and above a certain temperature, when the weight loss reaches a critical amount (which may typically be about 10 wt %) the material reaches its brittleness limit and starts to collapse. In large components, this brittleness limit may be encountered in the cell before the main part of the anode has been consumed, and could lead to massive failure.

The invention provides a composition for the boron-containing impregnating liquid that minimizes attack in the pitch phase and hence improves the strength of the carbon while improving the oxidation resistance or at least maintaining it at the same level. The invention therefore aims to reduce the anode consumption by reducing anode brittleness and further improving the oxidation resistance. Similar advantages can be obtained with cell sidewalls or other carbon bodies, such as Söderberg anodes, subjected to attack by oxidizing gases at high temperatures.

THE METHOD OF THE INVENTION

The invention provides a method of treating a carbon body, in particular a carbon-based anode or sidewall of an electrolytic cell for the production of aluminum, in particular by the electrolysis of alumina in a molten fluoride electrolyte such as cryolite, to improve the resistance thereof to deterioration by the attack of oxidizing gases, using boron in acceptable amounts in the surface parts exposed in use to oxidizing gases, in combination with selected agents and additives.

According to the invention, the boron-containing liquid contains at least one compound from the group consisting of aluminum compounds and calcium compounds such as aluminum acetate boric, colloidal alumina, calcium acetate, calcium carbonate, calcium oxide and calcium aluminate.

The anode impregnation treatment according to the invention provides a protected layer of one or more centimeters, in which the addition of the stated aluminum and/or calcium compound serves to minimize attack to the pitch binder phase and therefore improves the strength of the carbon when it is subjected to wear during use in the cell. The impregnation treatment also improves the oxidation resistance of the anode compared to impregnation with the boron compound alone, or at least maintains it at the same level.

The addition of aluminum compounds such as aluminum acetate boric and colloid alumina decreases the oxidation rate and increases strength. The addition of calcium compounds acts as a strength reinforcing agent and also produces an improvement in oxidation rate.

Possibly the protecting liquid contains at least one aluminum compound and at least one calcium compound that form calcium aluminate which acts as a cement to reinforce the carbon body.

The treatment applies particularly to prebaked carbon anodes, which are subject to mechanical stress during operation. With the treatment, damage to the outer surface is not detrimental to the protection against oxidation, due to the thickness of the treatment which provides a long-lasting protective effect as the lower part of the anode wears away slowly during use, with greatly improved mechanical resistance of the carbon.

The impregnation treatment can also be applied to the outer part of Söderberg anodes as they move down.

The impregnation treatment applies also to cell side walls, particularly the upper part of the cell side wall that is exposed to air and the effect of oxidizing gases during use, as well as the lower part exposed to carbo-oxidation reactions with $CO_2$ at the surface or the side wall submerged in the electrolyte.

In the case of impregnating cell side walls, the protective effect can be enhanced by topcoating the exposed part of the impregnated side walls with a layer of refractory material, e.g. particulate diboride in a colloidal carrier, such as titanium diboride in colloidal alumina, as described in WO 93/25731.

The following details of the impregnating process are given with reference to pre-baked carbon anodes, but apply in general to any carbon body subjected to attack by oxidizing gases.

The treating liquid comprises a boron compound such as $B_2O_3$, boric acid or tetraboric acid dissolved in a solvent possibly containing at least one surface-active agent. Good results have been achieved with boric acid and precursors of boric acid that form $B_2O_3$. Borates have not been found to give as good results.

The liquid preferably contains 5–60 weight % of the boron compound in particular using a liquid at a temperature in the range from 10° to 200° C., preferably 20° C. to 120° C. and more preferably 60° C. to 90° C., these conditions ensuring excellent penetration of the liquid into the porous carbon. For liquids with 50–60 weight % of boron compounds, solvents like methanol, ethylene glycol or glycerin are used at a temperature of about 80° C., or above.

It is advantageous to carry out the treatment with a heated liquid in order to increase the solubility of the boron compound and decrease the treatment time, but this involves heating the anode. Carrying the treatment out at ambient temperature is possible and also convenient because no special heating equipment is required.

At low temperatures, certain solvents such as methanol, ethylene glycol and glycerin will be preferred, possibly with additives to enhance the solubility of the boron compound, and the treatment time may be extended. When water is used as the solvent, surfactant agents, in particular tensio-active cationic agents devoid of components that would undesirably contaminate the aluminum produced and components that promote oxidation of the carbon, may be used. Anionic tensio-active agents can also be used. These surface-active agents may possibly be present together with other solubility improving agents such as tartaric acid or citric acid. The liquid may of course also be heated to improve and speed up the impregnation of the anode.

The use of surface active agents is an important factor to accelerate penetration of the liquid and to obtain impregnation to a sufficient depth of several centimeters in only a few minutes, since long treatment times could make the process impractical and uneconomical.

The coefficient of diffusion of the liquid into the porous carbon structure and the wettability of the carbon by the liquid will influence the rate and the degree of penetration. Liquids with low surface tension providing an angle of contact with the carbon of less than 90° provide adequate wettability and facilitate penetration. A suitable high temperature will also enhance diffusion of the liquid.

When water is chosen as solvent, a surfactant such as those available under the trade names NONIDET P 40 and SPAN 85, from Fluka, and GLUCOPON 225, DEHYPON LS, QUAFIN LDM and QUAFIN CT, from Henkel, can be used in order to achieve an acceptable low treatment time.

Generally, a boron salt is added to the solvent in a quantity sufficient to guarantee saturation or near saturation of the liquid upon heating, even leaving a deposit of the undissolved salt in the bottom of the vessel. The aluminum and/or calcium compounds are also added in amounts compatible with their solubilities, generally in a quantity which does not exceed ⅓ (usually no more than about ⅕th) the amount of boric acid.

An anode or a side-wall to be treated is then immersed in the boron-containing liquid. Immersion is continued for a set time, e.g. from 2–60 minutes, or until a desired intake of the liquid into the treated surfaces.

Usually, a single impregnation suffices, but the impregnation and drying may be repeated, if necessary, until the treated anode surface is saturated with the boron compound.

The vapors produced in the described conditions are non toxic and can be freely released into the air without a need for costly treatment installations.

The treatment time depends principally on the exposed surface area of the anode and its porosity, as well as temperature. It has been observed that prolonging the treatment does not significantly increase boron concentration.

Anodes are conveniently impregnated simply by dipping them into the liquid, which can take place in ambient conditions, but the impregnation may be assisted by the application of a pressure differential, by applying pressure or a vacuum. Other ways of speeding up impregnation can also be used, such as the application of ultrasounds.

In this way, the composite boron-containing liquid impregnates the carbon anode to a depth of 0.5–10 cm, for example approximately 2 to 4 or 5 cm, with a concentration of boron in the impregnated surface of the carbon anode in the range from 100 ppm to 0.35%, or possibly even higher. Even with the highest achievable levels of boron concentration, the problem of process contamination is avoided because the protective boron compounds are present only in the surfaces needing protection, and only to a depth of a few centimeters or less. For a pre-baked anode, only the top surface and the top part of the side surfaces need to be impregnated.

By impregnating the parts of the anode to be protected— namely the side and top surfaces—with a small quantity of the boron compound to a depth of 0.5 or several centimeters, and by the action of the aluminum and/or calcium compounds as additives to maintain the strength and improve the oxidation resistance, a long-lasting protective effect is achieved because the surfaces exposed to oxygen wear away very slowly over a long period, enhancing the strength while avoiding undesirable contamination of the aluminum produced.

The anode is usually made of petroleum coke and pitch, the anode having an open porosity of at least 5%, usually in the range 5 to 30%, preferably from 5 to 20%. The treatment can also be applied to porous carbon-based materials. For example, the anode may also be made of a composite carbon-based material comprising at least one further component such as refractory oxycompounds, in particular alumina. Examples of such materials are described in WO 93/25494.

The impregnation treatment of a pre-baked anode according to the invention is made after calcining where the anode surface has highest porosity, so improving the penetration of the liquid to a depth of 0.5 or several centimeters.

Oxidation of the anodes increases with porosity. Thus, with the impregnation treatment, the most porous part of the anode which is most prone to damage by oxidation is protected. In other words, more porous parts of the surface to be protected are penetrated more and deeper by the composite boron-containing liquid, providing greater protection where needed.

The intake of the composite boron-containing liquid into the anode can be monitored by checking the level of the liquid, or simply by the time of immersion for a given liquid and an anode of given porosity.

The top surfaces and at least the upper parts of the side surfaces of a pre-baked anode can be immersed in the composite boron-containing liquid by dipping the anode upside down in the liquid. There is no need to treat the bottom of the anode where the electrochemical reaction takes place. In this way, only those parts of the anode which need protection are treated in a simple way, and the amount of boron in the anode (and hence in the aluminum produced) is minimized.

When it is desired to treat rodded anodes, i.e. when the anode's current lead-in rod has already been connected to the top surface, it is more convenient to immerse the anodes with the rodded top side up. In this case, the lower surface of the anode which does not need protection against oxidation can for example be temporarily blocked by a product which prevents impregnation of the boron-containing liquid and which can be removed afterwards or volatilizes.

As an alternative, the carbon bodies can be treated by spraying the treating liquid as steam under high pressure. Particularly in the case of Söderberg anodes, the treating liquid can be sprayed in the outer surface of the mass.

Test Results

Tests have been made with carbon samples impregnated according to the invention, with non-impregnated carbon samples and with carbon samples impregnated with a boron-containing liquid alone, i.e. without the additives according to the invention ("boron only samples").

The non-impregnated samples showed severe weight loss when subjected to oxidizing conditions above 500° C. The boron-only samples showed a greatly increased resistance to oxidation, i.e. a much lower weight loss when subjected to the same oxidizing conditions. However, surprisingly, these samples were found to suffer a strength loss such that when the weight loss reaches a critical amount (found in the tests typically to be about 10%), the sample reaches its brittleness limit and is liable to collapse when subjected to stress.

Carbon samples impregnated according to the invention showed improved strength compared to the "boron only" samples under the same oxidizing conditions, with an equivalent oxidation resistance or with improved oxidation resistance.

The mechanism involved was investigated based on the fact that the carbon consists at least of two major phases, namely the petroleum coke particles and the pitch binder. The petroleum coke carbon and coked pitch carbon (calcined) were treated separately with the boron-only liquid to examine the influence of the treatment on the individual components when subjected to oxidation tests. Visual results indicated that a glassy layer was formed on the surface of the petroleum coke carbon. The petroleum carbon coke particles were not disintegrated after oxidation. However, disintegration was observed for the coked pitch carbon under similar conditions.

The results indicate that the oxidation rate of the pitch carbon is higher than the petroleum coke carbon. This high oxidation rate is on account of the amorphous phase and large surface area of the pitch carbon. The oxidation rate difference between two types of carbon therefore is enhanced when the pre-baked carbon anodes are treated with an oxidation prevention treatment. The preferential oxidation of pitch carbon makes the bonding phase (binder) fail early and can lead to damage because of a loss in strength. The strength loss by the preferential oxidation is indicated by a diametral tensile strength test. When a boron-only treatment is used, the preferential oxidation is enhanced and may lead to fracture of an anode even before significant oxidation. However, when a treatment with additives according to the invention is used, the preferential oxidation is suppressed and strength loss is limited.

For pre-baked anodes used in full-scale cells, it has been found that a brittleness limit may be encountered prior to oxidation damage. This brittleness limit is encountered in anodes which are impregnated with oxidation prevention liquids which increase the oxidation rate difference between the several phases present in the anode. Therefore several treatments which worked well in the laboratory are subject to failure when applied to commercial anodes. The new treatment according to the invention has been shown to significantly reduce the oxidation of the anode in laboratory tests as well as in commercial cell tests. This treatment suppresses the onset of the brittleness problem. The invention thus provides an anode treatment process which can be successfully applied to commercial anodes.

The carbon consumption due to air-oxidation of anodes treated this way corresponds to about 10–15% with respect to the net consumption, which is comparable to what can be achieved with traditional good aluminum protective coatings. Thus, the invention provides an excellent and long-lasting protective effect at much less cost and with less risk of imperfections in the protection than with aluminum coatings, and with better strength and oxidation resistance compared to impregnation with boron only.

The components of the treatment liquid are inexpensive and are non-polluting both for the aluminum production process and for the environment. The method is simple to carry out, and the treated surfaces are uniformly impregnated with the boron compounds, leading to reliability in use because of uniform wear to the exposed surfaces of the anode or sidewall. Also, as boron acts as a "negative catalyst", it is possible to make the anode and sidewall from carbon containing a higher content of vanadium, thereby reducing the cost of raw materials. Incorporation of the additive according to the invention minimizes strength loss so that large scale anodes or sidewalls can be made with improved oxidation resistance.

Further Aspects of the Invention

In addition to the above-described method, the invention also concerns a carbon body which has a part of its surface exposed during use to high temperature oxidizing gases, said surface part being treated, to improve the resistance thereof to deterioration by said oxidizing gases, by being impregnated with a boron-containing treatment liquid which contains at least one aluminum compound and at least one calcium compound, as discussed above.

Such a body may be a cell component of an aluminum-production cell treated by the methods set out above, and may incorporate all of the features described in connection with the method.

The impregnation treatment can also be applied to carbon masses forming a self-feeding Söderberg anode, preferably by treating only the part of the mass subjected to oxidation by the air and by anodically-evolved oxidizing gases.

The invention also concerns an electrolytic cell for the production of aluminum, in particular by the electrolysis of alumina in a molten fluoride electrolyte such as cryolite, comprising a pre-baked or Söderberg anode, or a sidewall, as set out above, the anode or sidewall being installed with the treated boron-containing surfaces in contact with air and oxidizing gases released during operation of the cell.

The invention also concerns the treating liquid itself which, in a preferred formulation, contains, per 100 ml of water with a small quantity of a surface-active agent, 2–10 grams of boron (as metal) and aluminum acetate boric together with at least one of calcium acetate and calcium carbonate in a total amount not exceeding the amount of boron.

Another aspect of the invention is use of the treating liquid to improve the resistance of a carbon body to deterioration by the attack of oxidizing gases at high temperatures.

A further inventive feature is that at the end of the service life of the boron-impregnated anodes, the remaining anode butt can be treated by thermal means or by means of water or another solvent or solvents, or by spray washing, to remove the remaining boron compounds, before recycling the remaining carbon to be mixed with fresh carbon for the manufacture of new anodes. By processing the used anode butts in this way, the residual boron is removed from the carbon, so that the new anodes including the recycled carbon do not unwantedly contain boron throughout their mass which would unwontedly increase the boron level in the product aluminum.

BRIEF DESCRIPTION OF DRAWINGS

The invention will be further described by way of example, and compared to the prior art, with reference to the accompanying drawings wherein.

SAMPLE PREPARATION

Figure 1:
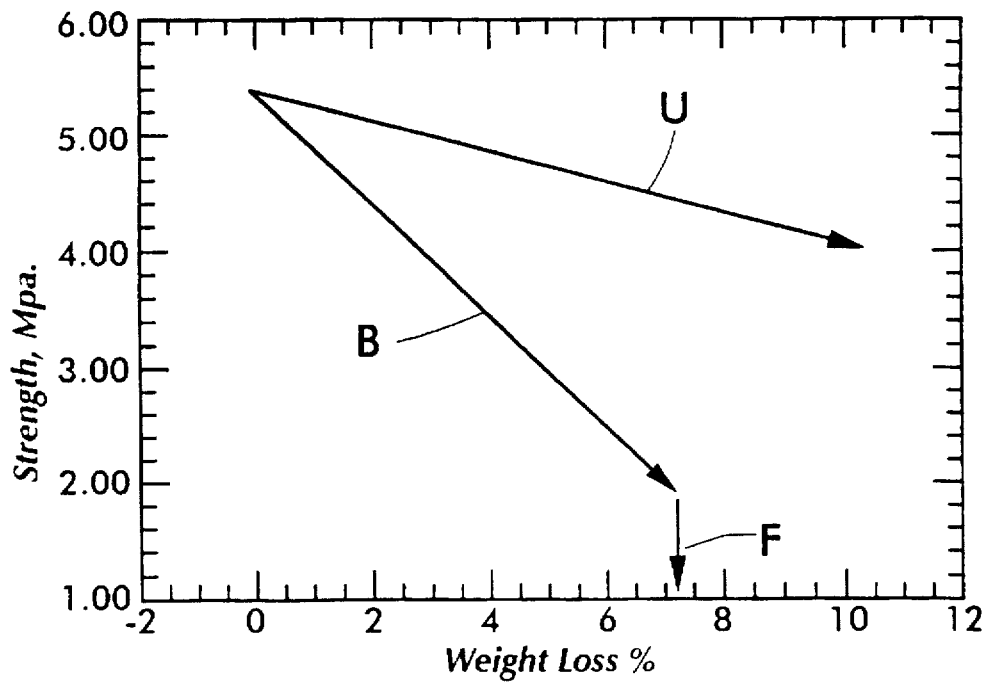
FIG. 1 is a graph of strength vs. weight loss for untreated samples and comparative samples impregnated with boron only.

Carbon anode samples were cut from pieces of commercial pre-baked anodes of a Hall-Héroult cell. The samples were fully dried at 150° C. for a drying time depending on their size. For samples consisting of a 3 cm long cylinder of diameter 5 cm, a 4 hour drying time is adequate. The samples weighed from 50–70 g, had a diameter of 5 cm and a length from about 2 to about 3 cm.

A typical boron-saturated impregnation liquid was prepared in the following proportions: 25 g of boric acid with the addition of 2 g aluminum acetate boric, 2 g calcium acetate and 0.5 g calcium carbonate in 100 ml of aqueous solvent.

Alternative additives were mixed from aluminum acetate boric+calcium carbonate; colloidal alumina alone; aluminum acetate boric alone; colloidal alumina+calcium acetate; colloidal alumina+calcium oxide; and aluminum acetate boric+calcium oxide. The total additive was kept about 4.5 g, i.e. just below ⅕th the amount of boric acid.

The liquid was heated to 85° C. and mixed until all of the additives were dissolved. Then 0.1 wt % of a surfactant agent (QUAFIN-CT available from Henkel) was added and mixed for 1 minute.

The anode sample is then immersed in the liquid at 85° C. For this purpose, the overall volume of the liquid must be five times greater than the anode sample and the sample must be able to be totally immersed in the liquid.

Upon immersion, bubbling is observed. The immersion time is dependent on the sample size. A 5 to 10 minute immersion time is recommended for a 3 cm long cylinder of diameter 5 cm.

The sample is then removed from the liquid and placed in a furnace at 180°–200° C. for a drying time dependent on the sample size. A 4 hour drying time was sufficient for a 3 cm long cylinder of diameter 5 cm.

Several samples were prepared as above, varying the liquid composition and the impregnation time. Samples where the addition of an aluminum and/or calcium compound was omitted are referred to as "boron-only". The treated samples and several untreated commercial carbon anode blocks of similar sample size were then subjected to the following test procedures.

Oxidation Test Procedure

An oxidation resistance test was performed in a static oxidation condition. The sample surface area and weight were measured before the sample was placed in the furnace and the weight change was measured after certain holding times. The static oxidation test was conducted at a controlled temperature of 500° C., 600° C. or 800° C.±5%; the duration of the exposure was 20 hours.

Mechanical Strength Test Procedure

The tensile strength of the samples was determined using a method called the diametral compression test. The test is based on the state of stress (F) developed when a cylindrical sample is compressed between two diametral opposite forces, to determine the maximum tensile stress ($S_T$), which acts on the loaded diameter during the test up to failure. At failure, the tensile strength can be calculated according to $S_T=2F/\pi hD$. The diameter to height ratio D/h typically ranges between 1.5 and 2.

An Instron-4206 machine was used to measure the diametral maximum stress on the treated and untreated samples. The cross head loading speed was kept at 0.1 mm/min. constant rate.

The diametral compression test was carried out on the samples after a given measured weight loss recorded in the oxidation test procedure.

Results

Untreated anodes showed severe weight loss after 20 hours at temperatures higher than 500° C. The weight loss is influenced by temperature and time. After an increase in time, the oxidation rate increases sharply. Oxidation occurs on the petroleum coke and pitch (bonding phase) and the sharp increase in oxidation is due to the loss of the bonding phase which increases the weight loss. For the untreated samples, the weight loss was so great it could not be effectively measured.

At 500° C. the boron-only impregnated samples show a negligible weight loss in a short term oxidation test (6 or 12 hours). However, in a long term oxidation test (500° C. for 150 hours or 600° C. for 15 hours) the samples showed a weight loss associated with a loss of strength. These boron-only impregnated samples thus showed a much lower weight loss, than untreated samples but the lower weight loss was associated with a higher strength loss as a function of the weight loss.

From this data it is deduced that with the boron-only impregnated samples, oxidation occurs mostly at the pitch location (bonding phase), which with time reduces the overall mechanical strength. After a certain time and temperature, when the weight loss reaches a critical amount (about 8–10 wt %) corresponding to the brittleness limit the sample starts to disintegrate.

The strength of the untreated and boron-only treated samples is plotted in FIG. 1 as a function of the percentage weight loss. It can be seen from this graph that the boron-only treated samples B progressively lose strength with increasing weight loss compared to the untreated samples U, it being understood that the boron-only treated samples are nevertheless advantageous due to the fact that they exhibit much improved oxidation resistance. At a given weight loss, about 8 wt % in this example, the boron-only treated samples reach the brittleness limit and are subject to failure, as indicated by F.

Commercial pre-baked anodes must be in service for about 30 days, during which time the observed strength loss becomes a factor for the loss of anode material.

Figure 2:
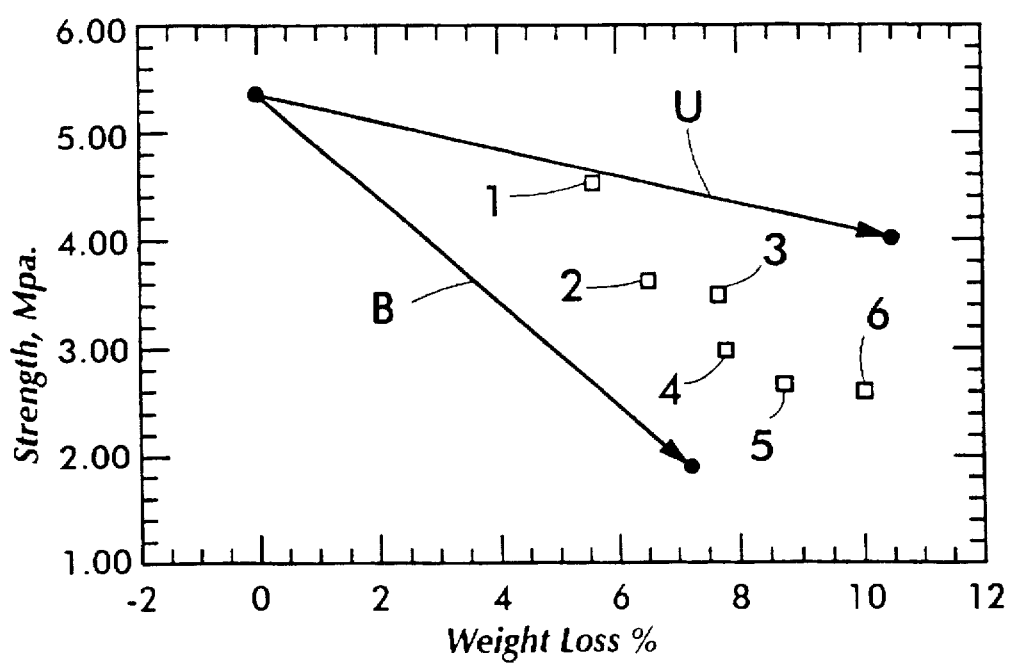
FIG. 2 is a similar graph on which is also plotted the results for samples impregnated with boron and alumina and/or calcium compounds according to the invention.

FIG. 2 is a similar graph to which have been added results with samples impregnated with alumina and/or calcium compounds according to the invention. All of these samples showed improved oxidation resistance compared to the boron-only impregnated samples, as well as improved strength as discussed above. The improved strength over the anode lifetime coupled with the improved oxidation resistance procured by the invention significantly improve the performance of anodes impregnated according to the invention over their service life.

The individual components of the additives for the plotted points were as follows:

1. aluminum acetate boric+calcium carbonate
2. colloidal alumina
3. aluminum acetate boric
4. colloidal alumina+calcium acetate
5. colloidal alumina+calcium oxide
6. aluminum acetate boric+calcium oxide

We claim:

1. A method of treating a carbon body which is to be exposed to oxidizing gases, to improve the resistance of the body to deterioration by said oxidizing gases, which comprises applying thereto a liquid containing at least one soluble boron compound and at least one compound from the group consisting of aluminium compounds and calcium compounds, as a powder, in suspension, as a colloid, or in the solution.

2. The method of claim 1, wherein the liquid contains at least one aluminum compound selected from aluminum acetate boric and colloidal alumina.

3. The method of claim 1, wherein the liquid contains at least one calcium compound selected from calcium acetate, calcium carbonate, calcium oxide and calcium aluminate.

4. The method of claim 1, wherein the liquid contains at least one aluminum compound and at least one calcium compound that form calcium aluminate.

5. The method of claim 1, wherein the liquid contains 2–6 grams of boron per 100 ml of liquid, the quantity of the aluminum and/or calcium compound being up to two times the quantity of boron.

6. The method of claim 1, wherein the boron-containing liquid comprises a boron compound dissolved in a solvent selected from methanol, ethylene glycol, glycerin, water and mixtures thereof.

7. The method of claim 6, wherein the boron-containing liquid further contains at least one surface-active agent.

8. The method of claim 1, wherein the boron-containing liquid contains $B_2O_3$, boric acid or tetraboric acid.

9. The method of claim 1, wherein the boron-containing liquid impregnates the carbon body to a depth of approximately 0.5 to 10 cm.

10. The method of claim 1, wherein the concentration of boron in the surface of the carbon body is in the range from 100 ppm to 0.35%.

11. The method of claim 1, wherein the treatment is carried out by immersion of the carbon body at a temperature of 20° to 200° C. in the boron-containing liquid at a temperature in the range of 10° to 200° C.

12. The method of claim 11, wherein the carbon body is immersed in the boron-containing liquid for about 2 minutes to 1 hour.

13. The method of claim 1, wherein impregnation of the boron-containing liquid in the carbon body is assisted by the application of a pressure differential.

14. The method of claim 1, wherein the boron-containing liquid is applied to the surface of the carbon body to be treated by spraying as steam under pressure.

15. The method of claim 1, wherein the carbon body is made of petroleum coke and pitch, or is a composite material comprising predominantly petroleum coke and pitch, the carbon body having an open porosity of at least 5%.

16. The method of claim 1, for treating a carbon body which is a component of an electrolytic cell for the production of aluminum by the electrolysis of alumina in a molten fluoride electrolyte, which component is exposed to air and anodically-released oxidizing gases present in the cell.

17. The method of claim 16, wherein said component is a pre-baked carbon anode.

18. The method of claim 17, wherein top and side surfaces of the anode are treated with the boron-containing liquid.

19. The method of claim 16, wherein said component is a carbon mass forming a Söderberg anode.

20. The method of claim 16, wherein said component is a cell sidewall.

21. The method of claim 20, which comprises applying a coating of refractory boride on top of the surface of the sidewall treated with the boron-containing liquid.

22. The method of claim 21, wherein a coating of particulate titanium diboride in colloidal alumina is applied to said surface.

23. A carbon body which has a part of its surface exposed during use to oxidizing gases, said surface part being impregnated, to improve the resistance thereof to deterioration by said oxidizing gases, with a liquid containing at least one soluble boron compound and at least one compound from the group consisting of alumina compounds and calcium compounds, as a powder, in suspension or as a colloid, or in solution.

24. The carbon body of claim 23, wherein the impregnating liquid contains at least one aluminum compound selected from aluminum acetate boric and colloidal alumina.

25. The carbon body of claim 23, wherein the impregnating liquid contains at least one calcium compound selected from calcium acetate, calcium carbonate, calcium oxide and calcium aluminate.

26. The carbon body of claim 23, which is a component of an electrolytic cell for the production of aluminum which component is exposed to air and anodically-released oxidizing gases present in the cell.

27. The carbon body of claim 26, which is a pre-baked carbon anode, having top and side surfaces impregnated with the said compounds.

28. The carbon body of claim 26, which is a mass forming a Söderberg anode.

29. The carbon body of claim 26, which is a cell sidewall.

30. The carbon body of claim 29, which comprises a coating of refractory boride on top at least a part of the impregnated surface of the sidewall.

31. The carbon body of claim 25, wherein the surface is impregnated with the boron compound to a depth of approximately 0.5 to 10 cm.

32. The carbon body of claim 31, wherein the concentration of boron in the impregnated surface is in the range from 100 ppm to 0.35%.

33. The carbon body of claim 25, which is made of petroleum coke and pitch, or is a composite material comprising predominantly petroleum coke and pitch, the body having an open porosity of at least 5%.

34. An electrolytic cell for the production of aluminum by the electrolysis of alumina in a molten fluoride electrolyte, comprising a component treated to improve its resistance to deterioration by oxidizing gases by applying thereto a boron-containing liquid according to claim 26, the component being installed with its treated surface in contact with oxidizing gases present in the cell.

35. The cell of claim 34, wherein the component is a prebaked carbon anode.

36. The cell of claim 34, wherein the component is a carbon mass forming a Söderberg anode.

37. The cell of claim 34, wherein the component is a sidewall.

38. The cell of claim 37, wherein at least a part of the treated surface of the sidewall is coated with a coating of refractory boride.

39. The cell of claim 38, wherein the applied coating comprises titanium diboride in colloidal alumina.

40. A boron-containing treating liquid for improving the resistance to oxidation of carbon bodies which are to be exposed to oxidizing gases, the liquid containing at least one soluble boron compound and at least one compound from the group consisting of aluminium compounds and calcium compounds, the aluminium compounds being selected from aluminium acetate boric and colloidal alumina and the calcium compounds being selected from calcium acetate, calcium carbonate, calcium oxide and calcium aluminate, as a powder, in suspension, as a colloid, or in solution.

41. The treating liquid of claim 40, which contains $B_2O_3$, boric acid or tetraboric acid.

42. The treating liquid of claim 40, which contains 2–6 grams of boron per 100 ml of liquid, the quantity of the aluminum and/or calcium compounds being up to two times the quantity of boron.

43. The treating liquid of claim 40, which contains at least one aluminum compound and at least one calcium compound that form calcium aluminate.

44. The treating liquid of claim 40, which contains, per 100 ml of water containing a surface-active agent, 20–30 grams of boric acid and at least one compound from said group consisting of aluminum compounds and calcium compounds in a total amount not exceeding two times the amount of boric acid.

45. The treating liquid of claim 40, which has a low surface tension providing an angle of contact with the carbon of less than 90° to provide adequate wettability and facilitate penetration.

46. The treating liquid of claim 45, containing a boron compound dissolved in a solvent selected form methanol, ethylene glycol, glycerin, water and mixtures thereof.

47. The treating liquid of claim 46, further containing at least one surface-active agent.

48. A method of processing a prebaked carbon anode according to claim 35 which anode has been partly consumed leaving an anode butt containing boron in its surface, comprising treating the anode butt by thermal means or by solvent(s) to remove the remaining boron compound before recycling the remaining carbon for the manufacture of new anodes.

49. The method of claim 9, wherein the boron-containing liquid impregnates the carbon body to a depth of approximately 2 to 5 cm.

50. The method of claim 11, wherein the treatment is carried out by immersion of the carbon body at a temperature of 20° to 200° C. in the boron-containing liquid at a temperature in the range of 20° C. to 120° C.

51. The carbon body of claim 31, wherein the surface is impregnated with the boron compound to a depth of approximately 2 to 5 cm.

* * * * *